July 21, 1964  C. L. REESE  3,141,302
SAFETY DEVICE FOR HYDRAULIC BRAKE SYSTEM
Filed Jan. 24, 1962  2 Sheets-Sheet 1
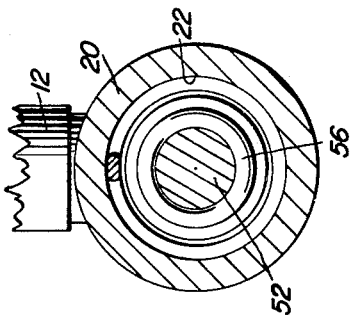
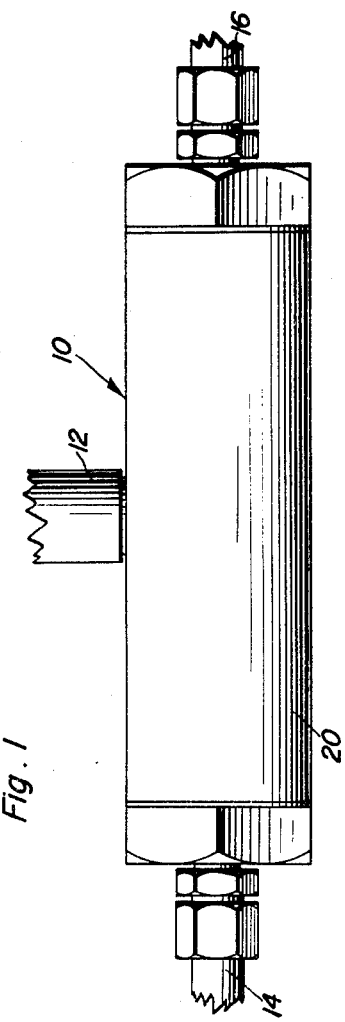
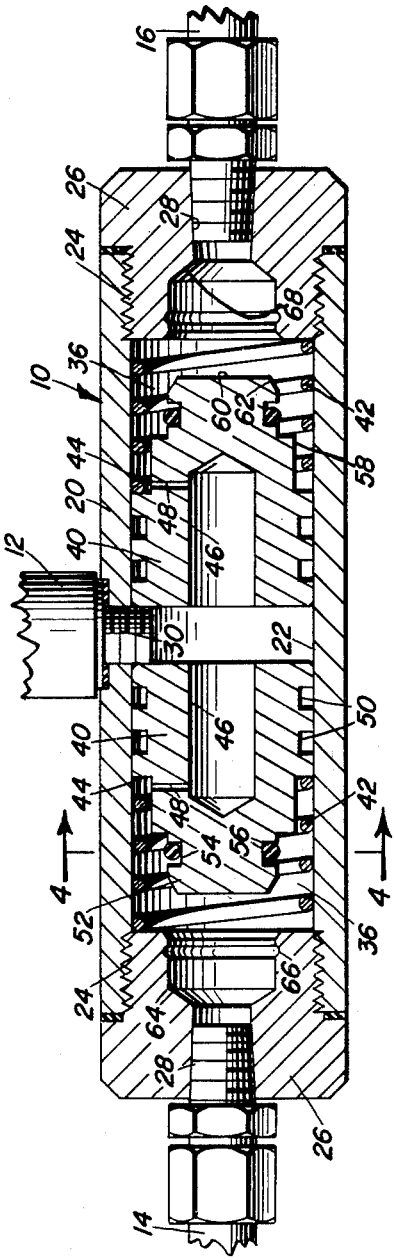
Cole L. Reese
INVENTOR.

July 21, 1964 C. L. REESE 3,141,302
SAFETY DEVICE FOR HYDRAULIC BRAKE SYSTEM
Filed Jan. 24, 1962 2 Sheets-Sheet 2
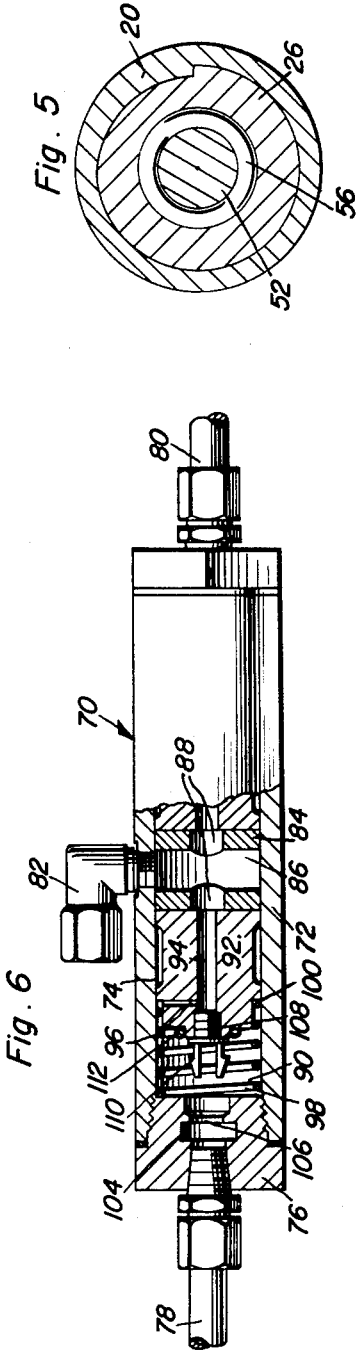
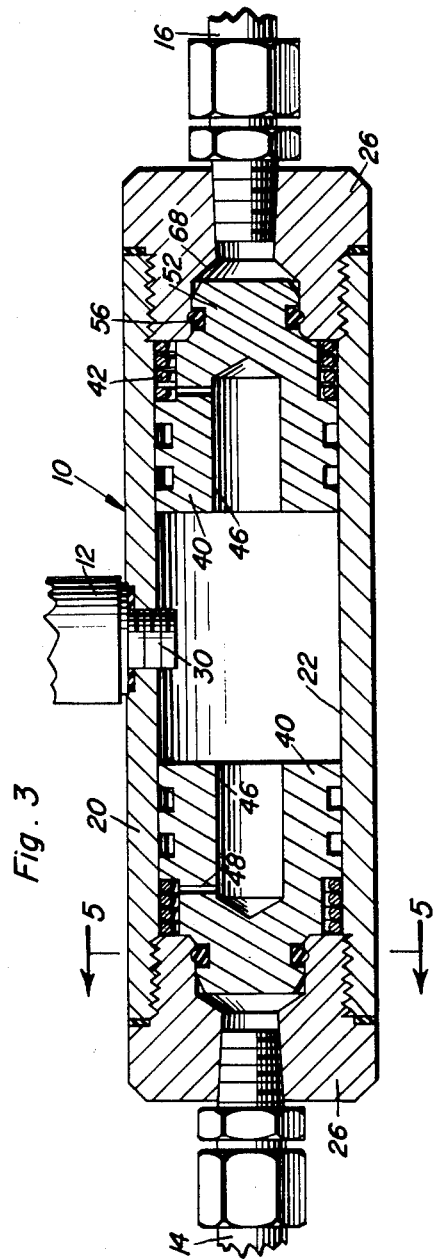
Cole L. Reese
INVENTOR.

United States Patent Office 3,141,302
Patented July 21, 1964

3,141,302
SAFETY DEVICE FOR HYDRAULIC BRAKE SYSTEM
Cole L. Reese, Oklahoma City, Okla.
(6426 Lakewood Blvd., Dallas, Tex.)
Filed Jan. 24, 1962, Ser. No. 168,444
11 Claims. (Cl. 60—54.5)

This invention comprises a novel and useful safety device for hydraulic brake systems and constitutes a continuation-in-part of my prior copending application Serial No. 96,582, filed March 17, 1961 with the same title and now abandoned.

The essence of the invention more particularly relates to a pulsator assembly adapted to be operatively placed between the master cylinder and the wheel cylinders of a fluid pressure operated brake system for automotive vehicles and the like.

The invention disclosed and claimed herein relates to a device of the same general type as that set forth in the prior Patent Nos. 2,745,252, 2,746,252, and 2,931,178 and constitutes an improvement thereover and particularly over the last mentioned patent.

The primary object of this invention is to provide a safety attachment which may be readily and easily applied to a fluid pressure operated brake system of the type wherein a single master cylinder imparts operation to a plurality of wheel cylinders, each of which is usually associated with a wheel brake of an automotive vehicle and the like, and whereby leakage in any of the wheel cylinders or in their supply lines connected to the safety device will automatically cause closing of the line in which the leak developed to thereby prevent loss of fluid from the other wheel cylinders and connecting lines.

A further very important object of the invention is to provide in a safety device in accordance with the foregoing objects a pulsator assembly having safety valves each of which is adapted to close a leaking delivery line and to retain said lines closed to thereby positively prevent any further escape of the operating pressure fluid therethrough.

A further important object of the invention is to provide a pulsator device in conformity with the foregoing objects which shall be of extremely simple, inexpensive and long wearing construction, and yet shall be sufficiently sensitive and highly effective for the purposes intended.

A still further important object of the invention is to provide a pulsator assembly in accordance with the foregoing objects wherein during normal operation of the fluid pressure operated brake system, a relatively small pulsating movement of the pulsator valve member shall take place, but whereby upon loss of fluid from any of the slave cylinders, or their connecting lines, the corresponding valve member shall be immediately moved to a position for closing off the flow of fluid to that line and for retaining the valve positively in such closing position.

An additional important object of the invention is to provide a pulsator assembly in conformity with the preceding objects whereby the assembly shall be capable of fabrication from inexpensive and readily available materials, with a minimum number of constructional manufacturing operations being required.

A further specific object of the invention is to provide in a pulsator assembly in accordance with the above mentioned objects means carried by and removable with the end closing plugs of a pulsator system for positively retaining a pulsating valve member in a position to close the pressure line associated with such end plug.

These together with other objects and advantages which will subsequently become apparent reside in the details of construction and operation as more fully hereinafter described and claimed, reference being had to the accompanying drawings forming a part hereof, wherein like numerals refer to like parts throughout, and in which:

FIGURE 1 is an elevational view showing a preferred embodiment of the safety device in accordance with this invention, the brake actuating lines and the hydraulic fluid supply lines being broken away;

FIGURE 2 is a vertical central longitudinal sectional view through the device of FIGURE 1 but upon an enlarged scale and showing the position of the plunger valves during normal operation of the brake system to which the safety device is attached;

FIGURE 3 is a view similar to FIGURE 2 but showing the position of the plunger valves when leaks have developed in the brake pressure lines or wheel cylinders connected thereto, and showing the plunger valves in their line closing positions therein;

FIGURES 4 and 5 are transverse vertical sectional detail views taken substantially upon the planes indicated by the section lines 4—4 and 5—5 respectively of FIGURES 2 and 3; and FIGURE 6 is a view partly in elevation and partly in vertical central longitudinal section through a modified construction of the safety device.

The present invention discloses a device quite similar in purpose to that of the prior patent of Louis Straus, No. 2,931,178 but differs chiefly from that patent in that the end plugs of the pulsator cylinder and the adjacent extremities of the pulsator plunger valves therein are provided with cooperating latch elements for mechanically locking the plunger valves in their closed position against the end plugs to thereby seal the brake lines connected to these end plugs and whereby it is necessary to remove the end plugs and then release the valve plungers in order to restore the device to normal operating condition.

The safety device of the present invention although especially adapted for use with the hydraulic brake systems of motor vehicles and the like is also applicable more generally to various types of fluid pressure operating systems which include therein an operating master cylinder unit, a plurality of associated operated cylinder units with a pulsator unit operatively interposed therebetween. Inasmuch as the operating and operated units may be of any conventional design, it is not deemed necessary to illustrate the same in the accompanying drawings nor to refer to them more specifically hereinafter in order to understand the features and details of the invention disclosed and claimed herein. It is to be understood that the present invention indicated generally by the numeral 10 constitutes a pulsator unit adapted to be used in such a fluid pressure operating system, and to be connected to the operating master cylinder unit as by a coupling member 12 and a suitable fluid pressure supply line, not shown, and to be connected to the operated units by the fluid pressure delivery lines 14 and 16.

The pulsator unit 10 is conveniently constituted by a hollow body 20 preferably of an elongated cylindrical shape and which has a hollow bore 22 extending axially therethrough, with the ends of this bore being internally threaded as at 24 for the reception of removable plugs 26 which constitute end walls for the opposite ends of the bore. These plugs in turn are internally threaded and bored as at 28 to provide a port means by which the delivery conduit 14 and 16 communicate with the interior of the body 20 at the opposite ends thereof.

It will be observed that the coupling or fitting 12 which constitutes the operating fluid inlet means for the bore 22 in the body 20 is threaded into the side of the body at substantially a midportion thereof and is secured thereto by a diametrically reduced externally threaded nipple 30 which extends into the bore 22. In some instances this nipple may terminate flush with the wall of the bore 22 but in general it is preferred to extend the nipple for a substantial distance into the bore to thus provide an obstruction across the bore for a purpose to be subsequently set forth.

It will be noted that the coupling or fitting 12 together with its nipple 30 functions as a means for continuously supplying fluids from a source of pressure into an actuator chamber provided by the central chamber or portion of the bore 22 and by its extension into the bore serves as an abutment or limit means for a pair of plungers 40, each disposed in one of the pulsator chambers 36 at the opposite ends of the bore 22.

The plungers 40 are of such diameter as to have a sufficiently close sliding fit with the bore 22 in the two the bore and the plungers is that any fluid tending to leakage of fluid past these plungers but to prevent a relatively rapid flow therepast. For example, there may be an operating clearance from .001 inch to .008 inch between the external diameter of the plungers 40 and the bore 22. The purpose of this provision for limited leakage between the bore and the plunger is that any fluid tending to leak by the plungers during their operation will tend to return to the pulsator chambers between the ends of the plunger and their respective end walls 26 as the plungers are returned and are seated against the nipple 30 by means of the compression springs 42 which abut against an annular shoulder 44 on the plungers and the inward extremity of the plunger 26.

It will be observed that each of the plungers has an axial bore or passage 46 extending partly therethrough and a transverse passage 48 communicates the interior of the passage 46 with the pulsator chamber 36 to thereby establish a very slow rate of leakage by means of which the pulsator chamber is maintained filled with the pressure fluid from the operating master cylinder in order to replenish any leakage which may occur in the hydraulic system.

It will be observed that the bores 46 are each continuously in communication with the central chamber in the bore 22 and thus are constantly subjected to the incoming fluid from the coupling 12. The plungers 40 thus by means of these bores 46 constitute a part of the operating hydraulic chamber of the safety device.

The external surfaces of the plungers 40 are provided with circumferentially extending grooves or channels 50 which constitute oil seals for the reciprocating plungers. Those ends of the plungers which are remote from each other and which are adjacent to the end plugs 26 constitute diametrically reduced axial extremities or projections 52 provided each with a circumferentially extending channel 54 in which is received an O-ring 56. The projecting portions 52 together with their diametrically enlarged intermediate portions 58 serve as a means for positioning and guiding the springs 42 in their operation. The outer ends of the plungers 40 terminate in flat perpendicular surfaces 60 having tapered or beveled edges as at 62.

Referring now to FIGURES 2 and 3 it will be observed that the port means of the end cap 26 comprising the end wall of each of the pulsator chambers 36 also serves as a portion of the latch means of the device. Thus, the axial bore 28 through the plug has an annularly enlarged recess 64 which extends inwardly of the plug from the inner end thereof. This recess is provided with a circumferentially extending internal groove 66 and has a tapered or outwardly flaring surface at its extremity as at 68.

The arrangement is such, that as shown by a comparison of FIGURES 2 and 3, when the plungers 40 are moved to their outer limits of travel in the pulsator chamber 36, the tapered surface 62 on the plunger extremity 52 will guide and facilitate entry of the projection 52 past the flaring surface 68 into the recess or chamber 64. This inward penetration will continue until the O-ring 56 is seated and retained in the locking groove 66. At this time the entry of the axial projections in the recess and the seating of the O-ring into the O-ring locking channel 66 serves to effectively prevent any further flow of fluid through the port 28. Further, the engagement of the O-ring in the recess prevents the return or withdrawal of the plunger so that the associated break line 14 or 16 is thus completely sealed against any further passage of fluid therethrough. This condition will continue until the end cap 26 is removed or until the fittings of the conduits 14 or 16 are removed from the bores 28 and the plungers forcibly released from their locked and seated engagement in the end plugs.

The operation of the device is as follows: Normally the parts are in the position shown in FIGURE 2 with both of the plungers 40 being maintained against the member 30 by the springs 42, with the pulsator chambers 36 filled with fluid, and with the entire hydraulic system being filled with fluid from the operating master cylinder unit through the fitting 12. When the operating unit is energized to impart a pressure impulse to the fluid column between the same and the plungers 40, this pressure impulse and the fluid forced thereby into the pulsator chambers between the plungers 40 and into their bores 46 serve to impart a corresponding outward sliding movement to the plungers 40. This outer movement of the plungers in turn drives the fluid which is trapped between the same and the end walls 26 of their pulsator chambers to in turn impart an operating impulse through the fluid in the conduits 14 and 16 to the operated units. Upon release of the impulse at the master cylinder, the springs 42 as well as the pressure applied to the fluid columns from the operated cylinders will return the plungers 40 towards the rest position of FIGURE 2. Thus, during operation of the hydraulic system there is intermittent reciprocation of the plungers in the pulsator chambers between the members 30 and their end walls 26. This movement is usually of insufficient magnitude to cause the latch means to engage. However, if for any reason a leak should develop in one of the operated cylinders or the associated conduit 14 or 16, so that the corresponding plunger 40 would be disposed too far in its cylinder by virtue of the loss of this fluid, this excessive outward travel of the plunger 40 will cause engagement of the O-ring in the O-ring groove of the end plug 26, thus closing that conduit system in which the leakage has occurred and prevent any further loss of leakage of fluid thereto so that continued operation of the master cylinder unit will be effective to operate the other operated cylinder units through the other plunger 40.

The latch means will thus maintain the valve means closed until such time as the latch means is manually released, which can be effected by readily removing the end plug 26 with the plunger 40 latched thereto and this disengages the latch in order to restore the parts to operative position. It is to be assumed that the condition which caused the operation of the safety device and latch means to seal off the leaking conduit will have been corrected prior to restoration of the device to its normal operating condition.

Attention is again directed to the bleed passage 48. It is of note that any time an object is placed within the passageway of a fluid or hydraulic system, interference with the free flow (breathing action) of that system occurs in one of two ways: First, it will either lock off the neutral return of the master cylinder plunger, thereby creating a "solid pedal" action which prevents the expanding of the wheel cylinder against the hub walls of the wheel, creating the braking action or secondly, it will create a "soft pedal" or spongy action which will require pumping of the foot pedal in order to obtain braking action. Passage 48, therefore, eliminates any interference of this so-called "bleeding action within the system" or dormant resistance therein.

Another use of passage 48 is that when installing the safety device for hydraulic brake system it is necessary to have this passage of sufficient size and location to prevent a premature latching or lock-up of the piston 40, by allowing a flow through action of fluid without interruption and without the use of a by-pass arrangement.

Any suitable electrical signalling system, not shown, may be employed to indicate that the device needs repair, servicing or readjustment due to loss of hydraulic fluid.

FIGURE 6 indicates a modified construction of the safety device but one which operates upon the same general principles as the preceding embodiment, and which modified construction forms the subject matter of my above identified prior copending application.

In this form of the invention the safety device has been indicated generally by the numeral 70 and consists of a cylindrical body 72 having a central axial bore 74 therethrough which is closed by the externally threaded end plugs 76 to which are connected a pair of brake line conduits 78 and 80. A coupling or fitting 82 connects the master cylinder, not shown, with the bore 74 by means of a hollow body 84 received within the bore and having a diametrical passage 86 therethrough which is in continuous communication with the fitting 82. A pair of ports 88 establish continuous communication between the passage 86 and a pair of hydraulic chambers 90 disposed at the opposite ends of the body 72 between the member 84 and the end plugs 76.

Reciprocating plungers 92 having an axial bore 94 therethrough together with a cross passage or bleed port 96 are provided for reciprocation in the chambers 90. Compression springs 98 abutting between the end plugs 76 and annular shoulders 100 on the plungers yieldingly urge the plungers towards the member 84 and away from the end plugs. In this form of the invention a different type of latch means is provided for retaining the plungers in their closing positions for stopping any further flow through the break line 78. Thus, the end plug 76 has an enlarged chamber 104 therein which communicates with the associated hydraulic chamber 90 passed through a restriction provided by the internal annular rib 106. A latch member consisting of an externally threaded plug 108 is seated in the end of the bore 94 in the plunger as is provided with resilient fingers 110 thereon which are engageable in the annular recess 104 and being inherently resiliently biased outwardly from each other will snap over and lock against the rib 106 to thereby retain the plunger in a closed position. An O-ring 112 on the plunger is adapted to seat against the adjacent end surface of the end plug 76 to effectively prevent flow of fluid through the end plug into the brake service line.

The operation of this form of the invention is substantially identical with that of the preceding embodiment.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A safety device for fluid pressure operated systems of the type having an operating master cylinder unit connected to a pair of operated cylinder units by a pulsator unit interposed therebetween; said pulsator unit comprising a body having an elongated bore whose central portion constitutes an actuator chamber and whose outer ends are closed by end walls and constitutes pulsator chambers each communicating with said actuator chamber and an operated cylinder unit, a pair of plungers each reciprocatable in said bore and each having its inner and outer ends respectively disposed in said actuator chamber and a pulsator chamber, means establishing communication between said master cylinder unit and said actuator chamber, each end wall having an opening therein by which the associated pulsator chamber is placed in communication with an operated cylinder unit, each plunger having a valve member upon its outer end engageable in said opening of the associated end wall in sealing engagement and blocking fluid flow through the latter, latch means on each plunger and its associated end wall retaining said valve means in sealing engagement in said openings, a bleed passage means extending between the opposite ends of each plunger and with its ends respectively opening into said actuator chamber and the associated pulsator chamber and establishing continuous but restricted communication between said actuator and pulsator chambers.

2. The combination of claim 1 including spring means disposed in said bore engaging said plungers and yieldingly urging them toward each other and into said actuator chamber.

3. The combination of claim 1 wherein said bleed passage means comprises an axial bore in each plunger opening into said actuator chamber and a bore of relatively smaller diameter permitting only a very restricted rate of flow and opening into said axial bore and into a pulsator chamber.

4. The combination of claim 1 wherein each plunger has its outer end portion diametrically reduced and constituting said valve member and being movable into said associated end wall opening.

5. The combination of claim 4 wherein said plunger has an intermediate diametrically reduced portion between said valve member and the remainder of said plunger, spring means in said bore encircling said valve member and said intermediate portion and abutting against said remainder of said plunger and said end wall and yieldingly urging said plunger inwardly of said actuator chamber.

6. The combination of claim 1 wherein said latch means comprises latch fingers projecting axially from the outer end of each plunger, said end walls having retaining means in said openings engageable by said latch fingers.

7. The combination of claim 6 wherein said plungers have axial bores therein, a plug seated in each axial bore and carrying said latch fingers.

8. The combination of claim 11 wherein said latch means comprises resilient, circumferentially extending and radially projecting rings on each plunger, said end wall openings having complementary grooves each receiving one of said rings.

9. The combination of claim 8 wherein said rings are mounted upon said valve members.

10. The combination of claim 1 wherein said latch means comprises latch fingers projecting axially from the outer end of each plunger, said end walls having retaining means in said openings engageable by said latch fingers, said plungers having axial bores therein, a plug seated in each axial bore and carrying said latch fingers, said bleed passage means including a passage of relatively restricted diameter communicating with and extending laterally from said axial bore and opening into the associated pulsator chamber.

11. The combination of claim 1 wherein said bleed passage means comprises a clearance between each plunger and the wall of said bore of sufficient restriction to affect a slow leakage between said actuator and pulsator chambers but prevent substantial fluid flow therethrough when the plungers are moved outwardly in the bore in response to operation of said master cylinder unit.

References Cited in the file of this patent

UNITED STATES PATENTS

| | | | |
|---|---|---|---|
| 1,905,077 | Walker | Apr. 25, | 1933 |
| 2,024,042 | Jance | Dec. 10, | 1935 |
| 2,128,853 | Roen | Aug. 30, | 1938 |
| 2,246,621 | Davis | June 24, | 1941 |
| 2,551,045 | Parker | May 1, | 1951 |
| 2,556,613 | Carter | June 12, | 1951 |
| 2,879,791 | Hollmann | Mar. 31, | 1959 |
| 2,931,178 | Straus | Apr. 5, | 1960 |
| 2,970,607 | Peck et al. | Feb. 7, | 1961 |
| 2,992,535 | Barragan | July 18, | 1961 |